United States Patent [19]
Brake

[11] 3,752,190
[45] Aug. 14, 1973

[54] RELAY VALVE FOR TRACTOR TRAILER BRAKE SYSTEMS

[75] Inventor: Cecil Clifford Brake, Raleigh, N.C.

[73] Assignee: Scovill Manufacturing Company, Waterbury, Conn.

[22] Filed: Dec. 28, 1971

[21] Appl. No.: 213,034

[52] U.S. Cl.......... 137/627.5, 137/505.18, 251/282
[51] Int. Cl............................................. F16k 31/12
[58] Field of Search............ 137/85, 505.18, 533.27, 137/543.15, 627.5; 91/457; 251/282; 303/54

[56] References Cited
UNITED STATES PATENTS

| | | | |
|---|---|---|---|
| 3,181,917 | 5/1965 | Dobrikin et al............... | 137/627.5 X |
| 2,470,746 | 5/1949 | Schultz.................................. | 303/54 |
| 2,656,014 | 10/1953 | Fites............................ | 137/627.5 X |
| 2,725,076 | 11/1955 | Hansen et al................... | 137/543.15 |
| 2,624,361 | 1/1953 | Brown........................ | 137/627.5 UX |

Primary Examiner—Robert G. Nilson
Attorney—Dallett Hoopes

[57] ABSTRACT

A relay valve for air systems in which a poppet valve member having seats for controlling respectively venting and supply is formed with an axial cylindrical bore and the valve housing has a polygonal shaft extending centrally upward, received by the bore for precise guiding of the poppet and permitting communication between the opposite ends of the poppet to provide a balanced valve member making springs and other compensating means unnecessary.

3 Claims, 4 Drawing Figures

Patented Aug. 14, 1973

INVENTOR.
Cecil Clifford Brake
BY *Dallett Hoopes*
ATTORNEY

Patented Aug. 14, 1973

INVENTOR.
Cecil Clifford Brake
BY Dallas Hooper
ATTORNEY

RELAY VALVE FOR TRACTOR TRAILER BRAKE SYSTEMS

This invention relates to a relay valve for tractor trailer brake systems. More specifically, this invention relates to a relay valve adapted upon actuation to control precisely the pressure transmitted to remote braking units so that there is similar braking forces exerted on the remote wheels as on the wheels more proximate the brake control.

Still more specifically, this invention relates to an improvement on a relay valve such as shown in the U. S. Pat. No. 2,656,014 to Fites and other structures in the art. Prior art structures have presented problems in that the control characteristics of the relay portion of the valves have had to be compensated due to the effect of unequal forces operating on opposite ends of the valve members.

It is an object of the present invention to provide a relay valve having a valve member operated on by equal forces on opposite ends with the result that the valve under the invention possesses improved control characteristics and requires no special compensating means.

Further objects of the invention will be understood from a reading of the following specification and examination of the drawings which show a non-limiting form of the invention.

SUMMARY OF THE INVENTION

Briefly, the invention relates to a relay valve in which the valve member or poppet has an axial passageway for the purpose of communicating atmospheric pressure to balance both ends of the valve member, the passageway receiving a fixed shaft of polygonal cross section to guide precisely the valve member and to still permit the indicated communication.

A PREFERRED EMBODIMENT IN DETAIL

Figure 1:
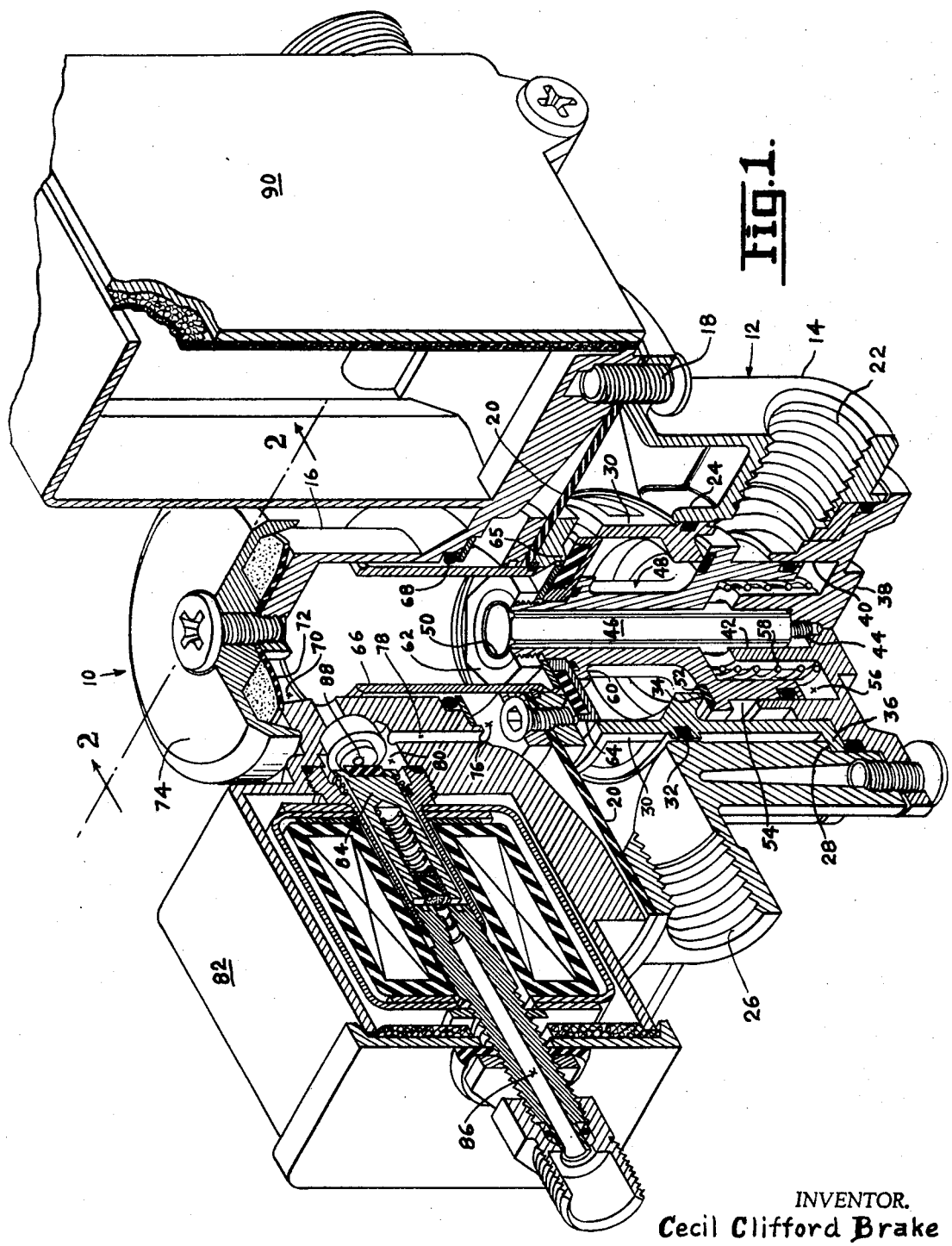
FIG. 1 is a sectioned perspective view of a preferred form of valve embodying the ivention.
Figure 2:
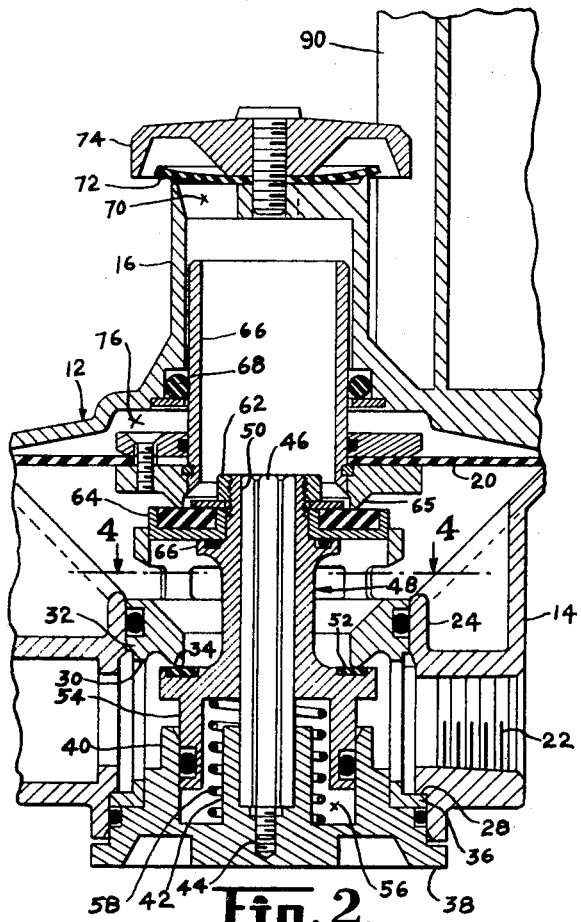
FIG. 2 is a fragmentary sectional view taken on the line 2—2 of FIG. 1 and showing the control valve closed.

Referring more specifically to the drawings, a valve embodying the invention is generally designated 10 in FIG. 1. It comprises a housing 12 including a lower section 14 and an upper section 16 joined together as at 18 with a flexible diaphragm member 20 clamped between the sections.

The lower section 14 is formed with a perpendicular internally threaded inlet 22 and a solid annular wall 24 thereabove. Disposed above the wall 24 is the internally treaded outlet 26 which also communicates with the inside of the lower section. Below the inlet 22, a section is formed with an annular shoulder 28 facing downwardly.

A cylindrical cage 30 is disposed in the housing an intermediate its ends is formed with a sealing web 32 facing outwardly and engaging the wall 24 intermediate the inlet 22 and the outlet 26. As shown, the web extends inwardly and downwardly to provide a circular seat 34. The lower end of the cage 30 is formed with an annular outward flange 36 which butts against the shoulder 28. A bottom cover 38 is secured as shown against the lower end of section 14 and sealingly holds the cage clamped against shoulder 28. The cover 38 as shown features an annular flange 40 having an inner cylindrical surface and directed upwardly against the lower end of the inside of the cage 30. Spaced inward from the flange 40 is a central boss 42 having an axial opening with a threaded lower recess as at 44. Held in the boss is a shaft 46 of polygonal cross section, preferably hexagonal as shown. The lower end of the shaft has a reduced threaded terminal which threadedly engages in recess 44.

Slideable on the shaft 46 is a poppet assembly 48 having a circular axial bore 50. The bore in diameter approximates the major cross-sectional dimension of the shaft 46 permitting close guidance of the movement of the poppet 48 but at the same time permitting air from above the poppet to communicate through the bore to the space therebelow. Adjacent its lower end, the poppet is formed with an outward flange carrying an upwardly facing gasket 52. A depending annular surface 54 from the poppet assembly engages the flange 40 in sealing fashion as shown to define a closed chamber 56. A spring 58 surrounds the boss 42 urging the poppet upward so that the gasket 52 engages seat 34.

Adjacent the upper end of the poppet 48 there is formed an outward sealing flange 60 against which is clamped by a nut 62 engaging the threaded upper end of the poppet, an upper annular gasket assembly 64.

As shown, the diaphragm 20 is formed with a central opening about which is clamped the outward flange of an upwardly extending exhaust tube 66. The upper section 16 of the housing is formed with an inwardly facing seal 68 which sealingly engages the outside of the tube 66. The upper end of the upper section 16 is formed with exhaust openings 70 conveniently covered by a rubber flap 72 and a cap 74. The diaphragm 20, upper section 16, and tube 66 define an annular control chamber 76 into which fluid is introduced through passageway 78 connected to the solenoid chamber 80.

Control fluid inlet to chamber 80 is monitored by the solenoid valve 82. Depending upon the position of the armature 84, either control air communicating to the chamber 80 through passage 86 from the brake pedal (not shown) or atmospheric relief air through passage 88 is present in chamber 80. Control of the solenoid is achieved by a computer positioned in the housing 90 which operates in a manner not part of this invention.

Figure 3:
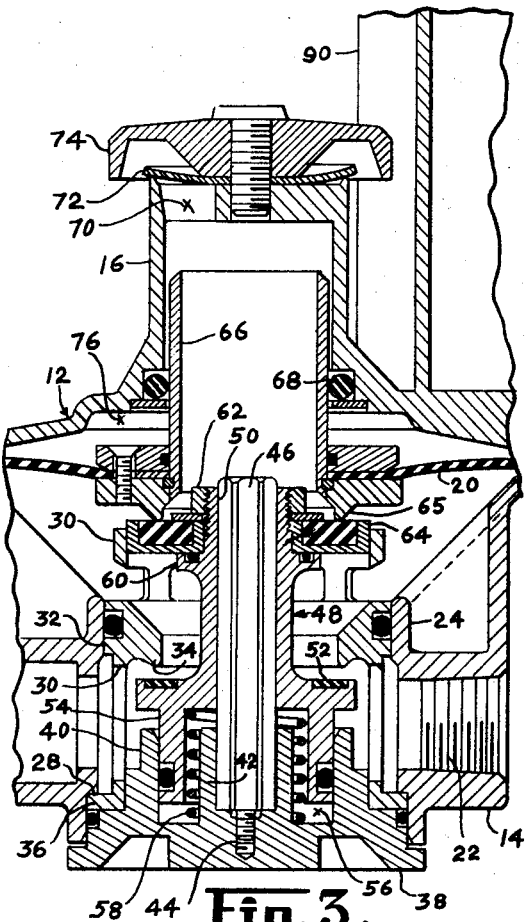
FIG. 3 is a view similar to FIG. 2 but showing the valve pressed open to transmit pressure to the remote braking units.
Figure 4:
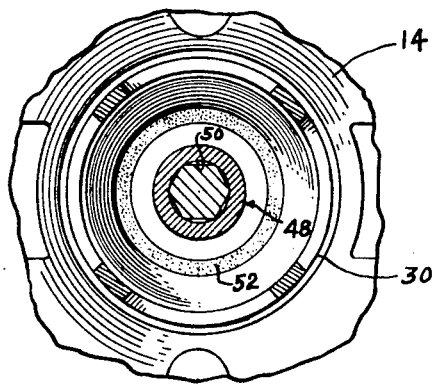
FIG. 4 is a sectional view taken on the line 4—4 of FIG. 2.

It will suffice to say that upon actuation of the brake control in normal circumstances, the control air travels through the passage 86, past the armature 84, into chamber 80 through passage 78, and into control chamber 76. Build-up of pressure in chamber 76 flexes the diaphragm 20 downward so that seat 65, engaging gasket 64, urges the poppet 48 downward. This, as shown in FIG. 3, lowers the gasket 52 from seat 34 and permits air to flow from the inlet 22 out through outlet 26 to the braking units. As soon as the pressure on the downward side of the diaphragm 20 builds up sufficiently to equalize the pressure in the control chamber 76, the diaphragm will raise permitting the gasket 52 one again to seat.

Should the control air in chamber 76 drop as by release of the operator's foot from the brake pedal, the diaphragm will flex upward because of the higher pressure on its underside and seat 65 will raise from gasket 64 permitting exhaust out tube 66.

Under circumstances of too rapid deceleration of the wheels remote braking units as sensed by the computer 90, the solenoid valve 82 may be activated to move the armature 84 leftwardly to relieve air in control chamber 76 through the vent passage 88. This will have the effect of releasing to an extent the activation of the braking units and will avoid skidding.

A special feature of the invention is the use of the combined axial bore 50 of the poppet and the polygonal cross-section shaft 46. This permits atmospheric air from above the shaft to communicate down to the chamber 56 to equalize pressure on the poppet within the inside diameter of the wall of the flange 40 which approximates the diameter of the seat 65. Because of this equalization, the effect of the atmospheric pressure in the upper end of the poppet which is less than the pressure inside the valve, is cancelled out and no special compensating springs or other devices either in the valve or in the braking unit is required. There is thus provided a valve which is accurate in operation, has extremely good control characteristics, and is relatively simple to make and assemble.

The invention may be described in the following claim language:

I claim:

1. In a relay valve comprising a housing having an exhaust opening at its upper end, a partition in the housing dividing a lower supply chamber having supply means from an upper delivery chamber having an outlet means, the partition having a circular opening with a seat thereabout, a dual valve spool disposed axially in the housing and mounting a pair of spaced upwardly facing gaskets, one above the other, the lower gasket adapted to engage the seat, means biasing the spool upward into such engagement, a diaphragm in the housing and parallel to and above the partition and defining a control chamber in the housng thereabove, the diaphragm having a central opening closed by an upwardly extending open tube, the lower end of the tube having an exhaust seat adapted to engage the upper gasket of the spool and the upper end of the tube slideably and sealingly engaging in the exhaust opening of the housing; the improvement of the dual valve spool having a central axial cylindrical opening and a depending annular surface approximately the same diameter as the exhaust seat, a rigid shaft of equilateral polygonal cross section fixedly secured to and extending upward from the lower end of the housing, the shaft and the cylindrical opening having approximately the same major cross-sectional dimension, an annular flange surrounding the shaft and extending upward from the lower end of the housing, the flange telescopingly and sealingly engaging said depending surface to form a closed chamber, the shaft slideably penetrating the dual valve spool by its axial opening to guide precisely the vertical reciprocation of the dual valve spool and to communicate ambient air from the exhaust opening to the closed chamber to balance pressures on opposite ends of the spool within the diameter and to thereby improve control characteristics.

2. A relay valve as described in claim 1 wherein spring means surrounds the shaft intermediate the lower end of the housing and the dual valve spool and urges the spool upwardly.

3. A relay valve as described in claim 1 wherein the shaft is of hexagonal cross-section.

* * * * *